US012606725B2

(12) United States Patent
Koravos et al.

(10) Patent No.: US 12,606,725 B2
(45) Date of Patent: Apr. 21, 2026

(54) ADHESIVE TAPE ROLL WITH COLOR-CHANGING DYE

(71) Applicants: David Franklin Koravos, San Diego, CA (US); Audrey Dickinson, San Diego, CA (US); Alder Ensberg, San Diego, CA (US)

(72) Inventors: David Franklin Koravos, San Diego, CA (US); Audrey Dickinson, San Diego, CA (US); Alder Ensberg, San Diego, CA (US)

( * ) Notice: Subject to any disclaimer, the term of this patent is extended or adjusted under 35 U.S.C. 154(b) by 206 days.

(21) Appl. No.: 18/388,033

(22) Filed: Nov. 8, 2023

(65) Prior Publication Data

US 2024/0166924 A1 May 23, 2024

Related U.S. Application Data

(60) Provisional application No. 63/384,529, filed on Nov. 21, 2022.

(51) Int. Cl.
| | |
|---|---|
| *C09J 7/30* | (2018.01) |
| *C09J 7/40* | (2018.01) |
| *C09J 11/04* | (2006.01) |
| *C09J 11/06* | (2006.01) |

(52) U.S. Cl.
CPC ................ *C09J 11/06* (2013.01); *C09J 7/30* (2018.01); *C09J 7/40* (2018.01); *C09J 11/04* (2013.01); *C09J 2301/408* (2020.08); *C09J 2400/10* (2013.01); *C09J 2400/20* (2013.01); *Y10S 428/906* (2013.01); *Y10T 428/1476* (2015.01); *Y10T 428/28* (2015.01)

(58) Field of Classification Search
None
See application file for complete search history.

(56) References Cited

U.S. PATENT DOCUMENTS

| | | | | | |
|---|---|---|---|---|---|
| 3,537,578 | A | * | 11/1970 | Figliuzzi | B65D 85/672 |
| | | | | | 427/210 |
| 7,434,535 | B2 | * | 10/2008 | Adamy | G04F 1/06 |
| | | | | | 368/327 |
| 2002/0155243 | A1 | * | 10/2002 | Kobe | C09J 7/10 |
| | | | | | 428/40.1 |
| 2003/0152730 | A1 | * | 8/2003 | Bradley | C09J 7/22 |
| | | | | | 428/354 |
| 2005/0051261 | A1 | * | 3/2005 | Albanese | B32B 3/04 |
| | | | | | 439/39 |
| 2010/0186659 | A1 | | 7/2010 | Labrosse et al. | |
| 2015/0020961 | A1 | * | 1/2015 | Grisle | B32B 7/12 |
| | | | | | 156/247 |
| 2015/0253252 | A1 | | 9/2015 | Smyth et al. | |
| 2016/0011157 | A1 | | 1/2016 | Smyth et al. | |
| 2017/0355886 | A1 | * | 12/2017 | Jung | C08G 59/5013 |
| 2019/0292412 | A1 | * | 9/2019 | Yamasaki | C09J 4/06 |
| 2021/0238451 | A1 | | 8/2021 | Bartholomew et al. | |

FOREIGN PATENT DOCUMENTS

| | | | | | |
|---|---|---|---|---|---|
| JP | 10330708 | A | * | 12/1998 | |
| JP | H10330708 | A | * | 12/1998 | |
| WO | WO-2020189390 | A1 | * | 9/2020 | B32B 27/18 |

OTHER PUBLICATIONS

Hoshino Hideo et al., machine translation of JPH10330708A, Dec. 15, 1998 (Year: 1998).*
Machine translation of WO2020189390 A1, Sep. 24, 2020 (Year: 2020).*
Machine translation of JPH10330708 A, Dec. 15, 1998 (Year: 1998).*
Lee et al., "Novel UV-Activated Colorimetric Oxygen Indicator" Chem. Mater. 2005, 17, 2744-2751.
International search report and written opinion for International Patent Application No. PCT/US23/79078 dated Mar. 13, 2024.

* cited by examiner

*Primary Examiner* — Anish P Desai

(57) ABSTRACT

Provided herein is a tape roll configured to include an adhesive associated with a color-changing dye to provide the user with a visible marker for the end of the tape roll. In certain aspects, the adhesive is associated with a redox indicator. In certain aspects, the redox indicator is activated upon exposure to air.

3 Claims, 5 Drawing Sheets

Liner

Adhesive with indicator

Indicator creates
visible line to
demarcate tape
terminus

Indicator activated upon exposure to air

Activated indicator visible through outer layer of tape

ADHESIVE TAPE ROLL WITH COLOR-CHANGING DYE

RELATED APPLICATION

This patent application claims the benefit of U.S. provisional patent application No. 63/384,529 filed on Nov. 21, 2022, entitled ADHESIVE TAPE ROLL WITH COLOR-CHANGING DYE, and naming Davis Franklin Koravos, Audrey Dickinson, and Alder Ensberg as inventors. The entire content of the foregoing patent application is incorporated herein by reference for all purposes, including all text, tables and drawings.

INTRODUCTION

It can be difficult for a user to locate the end of an adhesive tape roll, as the line demarcating the end can blend in with the rest of the tape roll, rendering it invisible or substantially invisible (see e.g., FIG. 1). Provided herein is a tape roll configured to include an adhesive associated with a color-changing dye to provide the user with a visible marker for the end of the tape roll.

SUMMARY

Provided herein are compositions comprising an adhesive, and an indicator or indicator system, where the indicator is activated upon exposure to one or more atmospheric components. In some embodiments, the composition further comprises a liner. In some embodiments, the liner is transparent. In some embodiments, the liner is translucent. In some embodiments, the liner is configured in a roll. In some embodiments, the indicator is a redox indicator. In some embodiments, the indicator comprises a color-changing dye. In some embodiments, the indicator comprises methylene blue (MB). In some embodiments, the indicator system is a redox indicator system. In some embodiments, the indicator system comprises one or more of methylene blue (MB), titania (TiO2), and triethanolamine (TEOA).

Also provided herein is an adhesive tape roll comprising a liner, an adhesive, and a redox indicator system, wherein the indicator is activated upon exposure to one or more atmospheric components. In some embodiments, the redox indicator system comprises one or more of methylene blue (MB), titania (TiO2), and triethanolamine (TEOA).

DETAILED DESCRIPTION

Figure 1:
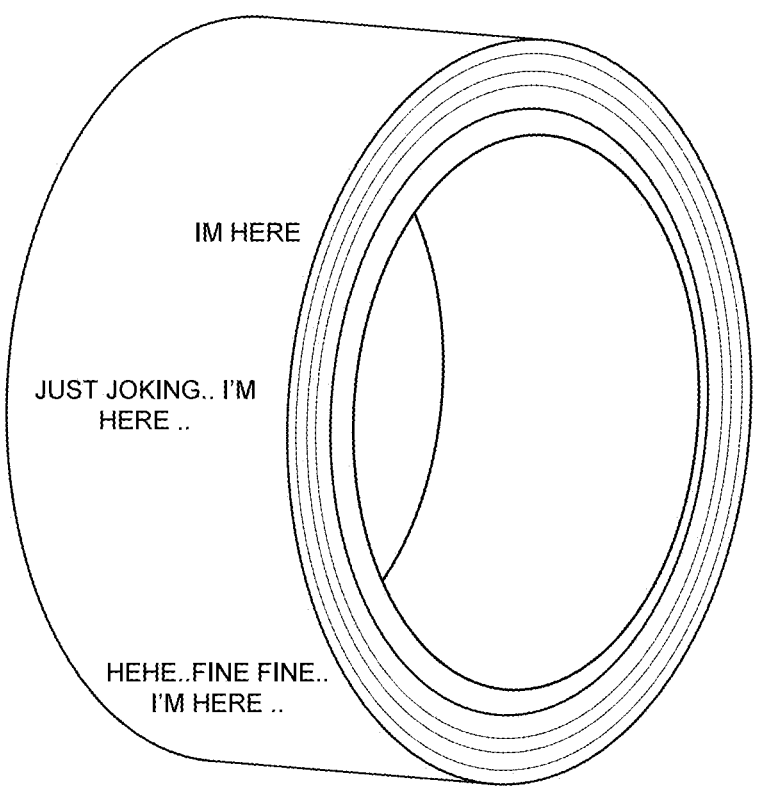
FIG. 1 shows a typical transparent adhesive tape roll in a closed position where the tape terminus is difficult to locate.

Before the compositions of the present disclosure are described in greater detail, it is to be understood that the compositions are not limited to particular embodiments described, as such may, of course, vary. It is also to be understood that the terminology used herein is for the purpose of describing particular embodiments only, and is not intended to be limiting, since the scope of the compositions will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the compositions. The upper and lower limits of these smaller ranges may independently be included in the smaller ranges and are also encompassed within the compositions subject to any specifically excluded limit in the stated range. Where the stated range includes one or both of the limits, ranges excluding either or both of those included limits are also included in the compositions.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which the compositions belong. Although any compositions similar or equivalent to those described herein can also be used in the practice or testing of the compositions, representative illustrative compositions are now described.

All publications and patents cited in this specification are herein incorporated by reference as if each individual publication or patent were specifically and individually indicated to be incorporated by reference and are incorporated herein by reference to disclose and describe the materials and/or methods in connection with which the publications are cited. The citation of any publication is for its disclosure prior to the filing date and should not be construed as an admission that the present compositions are not entitled to antedate such publication, as the date of publication provided may be different from the actual publication date which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the compositions, which are, for clarity, described in the context of separate embodiments, may also be provided in combination in a single embodiment. Conversely, various features of the compositions, which are, for brevity, described in the context of a single embodiment, may also be provided separately or in any suitable sub-combination. All combinations of the embodiments are specifically embraced by the present disclosure and are disclosed herein just as if each and every combination was individually and explicitly disclosed, to the extent that such combinations embrace operable processes and/or compositions. In addition, all sub-combinations listed in the embodiments describing such variables are also specifically embraced by the present compositions and are disclosed herein just as if each and every such sub-combination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods. Any recited method can be carried out in the order of events recited or in any other order that is logically possible.

Provided herein are compositions comprising an adhesive. In some embodiments, an adhesive is a pressure-sensitive adhesive (PSA), which may also be referred to as a self-adhesive and/or a self-stick adhesive. A pressure-sensitive adhesive is a type of nonreactive adhesive which forms a bond when pressure is applied to bond the adhesive with a surface. Typically, no solvent, water, or heat is needed to activate the adhesive. Generally, pressure-sensitive adhesives are used in instances where the adhesion is not intended to be permanent and subsequent separation is desired. Pressure-sensitive adhesives may be used, for example, on adhesive films and tapes, on double-sided sticky tape and sticky pads, as well as on sticky notes, self-adhesive labels and films. Pressure-sensitive adhesives are designed with a balance between flow and resistance to flow. The bond forms because the adhesive is soft enough to flow, or wet, the adherend. The bond has strength because the adhesive is hard enough to resist flow when stress is applied to the bond. Once the adhesive and the adherend are in proximity, there are also molecular interactions such as van der Waals forces involved in the bond, which contribute significantly to the ultimate bond strength. PSAs exhibit viscoelastic (viscous and elastic) properties, both of which are used for proper bonding.

PSAs are usually based on an elastomer compounded with a suitable tackifier (e.g., a rosin ester). The elastomers can be based on acrylics, which can have sufficient tack on their own and do not require a tackifier. Styrene block copolymers (SBC), also called styrene copolymer adhesives and rubber-based adhesives, have good low-temperature flexibility, high elongation, and high heat resistance. They are frequently used in hot melt adhesive applications, where the composition retains tack even when solidified. They usually have A-B-A structure, with an elastic rubber segment between two rigid plastic endblocks. High-strength film formers as standalone, increase cohesion and viscosity as an additive. Water-resistant, soluble in some organic solvents; cross-linking improves solvent resistance. Resins associating with endblocks (cumarone-indene, α-methyl styrene, vinyl toluene, aromatic hydrocarbons, etc.) improve adhesion and alter viscosity. Resins associating to the midblocks (aliphatic olefins, rosin esters, polyterpenes, terpene phenolics) improve adhesion, processing and pressure-sensitive properties. Addition of plasticizers reduces cost, improves pressure-sensitive tack, decrease melt viscosity, decrease hardness, and improves low-temperature flexibility. The A-B-A structure promotes a phase separation of the polymer, binding together the endblocks, with the central elastic parts acting as cross-links; SBCs do not require additional cross-linking. Styrene-butadiene-styrene (SBS) is used in high-strength PSA applications, styrene-ethylene/butylene-styrene (SEBS) in low self-adhering non-woven applications, and styrene-ethylene/propylene (SEP) and styrene-isoprene-styrene (SIS) are used in low-viscosity high-tack PSA applications. In some embodiments, an adhesive is a polymer. In some embodiments, an adhesive is an acrylate. In some embodiments, an adhesive is a rubber (e.g., a natural rubber, a synthetic rubber).

Provided herein are compositions comprising an indicator. An indicator may be a chemical indicator and may include any substance that gives a visible sign (e.g., a color change) of the presence or absence or a threshold concentration of a chemical species. In some embodiments, an indicator herein is activated upon exposure to one or more atmospheric components. Atmospheric components include, for example, oxygen, nitrogen, argon, carbon dioxide, methane, water vapor, and neon. In some embodiments, an indicator herein is activated upon exposure to oxygen. In some embodiments, an indicator herein is activated upon exposure to nitrogen. In some embodiments, an indicator herein is activated upon exposure to argon. In some embodiments, an indicator herein is activated upon exposure to carbon dioxide. In some embodiments, an indicator herein is activated upon exposure to methane. In some embodiments, an indicator herein is activated upon exposure to water vapor. In some embodiments, an indicator herein is activated upon exposure to neon.

In some embodiments, the indicator is a redox indicator. A redox indicator (also referred to as an oxidation-reduction indicator) is an indicator which undergoes a definite color change at a specific electrode potential, and is described in further detail in Example 1. A redox indicator may be pH independent or pH dependent. Examples of redox indicators are provided in the tables below.

| pH Independent Indicators | | |
|---|---|---|
| Indicator | Color of oxidized form | Color of reduced form |
| 2,2'-bipyridine (Ru complex) | colorless | yellow |
| Nitrophenanthroline (Fe complex) | cyan | red |
| N-Phenylanthranilic acid | violet-red | colorless |
| 1,10-Phenanthroline iron(II) sulfate complex (Ferroin) | cyan | red |
| N-Ethoxychrysoidine | red | yellow |
| 2,2'-Bipyridine (Fe complex) | cyan | red |
| 5,6-Dimethylphenanthroline (Fe complex) | yellow-green | cyan |
| o-Dianisidine | red | colorless |
| Sodium diphenylamine sulfonate | red-violet | colorless |
| Diphenylbenzidine | violet | colorless |
| Diphenylamine | violet | colorless |
| Viologen | colorless | blue |

| pH Dependent Indicators | | |
|---|---|---|
| Indicator | Color of oxidized form | Color of reduced form |
| Sodium 2,6-Dibromophenol-indophenol or Sodium 2,6-Dichlorophenol-indophenol | blue | colorless |
| Sodium o-Cresol indophenol | blue | colorless |
| Thionine (AKA Lauth's violet) | violet | colorless |
| Methylene blue | blue | colorless |
| Indigotetrasulfonic acid | blue | colorless |
| Indigotrisulfonic acid | blue | colorless |
| Indigo carmine (AKA Indigodisulfonic acid) | blue | colorless |

| pH Dependent Indicators | | |
| --- | --- | --- |
| Indicator | Color of oxidized form | Color of reduced form |
| Indigomono sulfonic acid | blue | colorless |
| Phenosafranin | red | colorless |
| Safranin T | red-violet | colorless |
| Neutral red | red | colorless |

In some embodiments, an indicator comprises a color-changing dye. In some embodiments, an indicator comprises one or more components described in the tables above. In some embodiments, an indicator comprises a thiazine dye. In some embodiments, an indicator comprises methylene blue (MB).

In some embodiments, a composition herein comprises a redox indicator system. An example redox indicator system is described in Example 1. In some embodiments, a redox indicator system comprises one or more components described in the tables above. In some embodiments, a redox indicator system comprises a thiazine dye. In some embodiments, a redox indicator system comprises methylene blue (MB). In some embodiments, a redox indicator system comprises a semiconductor. In some embodiments, a redox indicator system comprises a UV-sensitive semiconductor. Any semiconductor or UV-sensitive semiconductor suitable for the compositions described herein may be used. In some embodiments, a redox indicator system comprises titania (TiO2). In some embodiments, a redox indicator system comprises an electron donor. In some embodiments, a redox indicator system comprises a sacrificial electron donor (SED). Any electron donor or sacrificial electron donor suitable for the compositions herein may be used. In some embodiments, a redox indicator system comprises triethanolamine (TEOA). In some embodiments, a redox indicator system comprises one or more of a thiazine dye, a UV-sensitive semiconductor, and a sacrificial electron donor (SED). In some embodiments, a redox indicator system comprises one or more of methylene blue (MB), titania (TiO2), and triethanolamine (TEOA).

In some embodiments, an adhesive is associated with an indicator. In some embodiments, an adhesive and an indicator are intercalated (i.e., components of each are mixed with no distinctive layers). In some embodiments, an adhesive and an indicator are provided as distinct layers.

A composition herein may further comprise a liner. A liner may also be referred to as a backing. A liner may be made of any material suitable for the purpose of the compositions described herein, such as a plastic film. A liner may be transparent. A liner may be translucent. In some embodiments, a composition comprises an adhesive intercalated with an indicator applied to one side of a liner. In some embodiments, a composition comprises a liner comprising, on one side, a layer of adhesive and a layer of indicator. In some embodiments the liner is coated, on one side, with an adhesive and an indicator. The side of a liner coated with an adhesive and an indicator may be referred to herein as an adhesive side or underside. The side of a liner not coated with an adhesive and an indicator may be referred to herein as a non-adhesive side, outer side, or outer layer.

Figure 2:
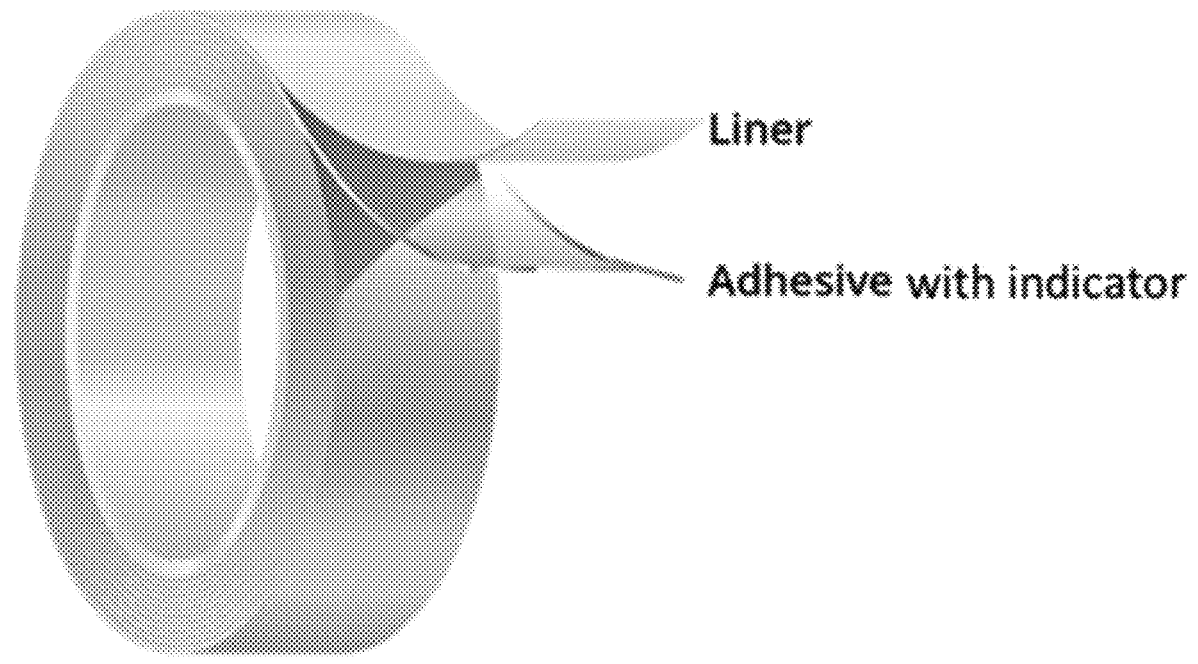
FIG. 2 shows an example adhesive tape roll configuration where the adhesive is associate with an indicator.
Figure 3:
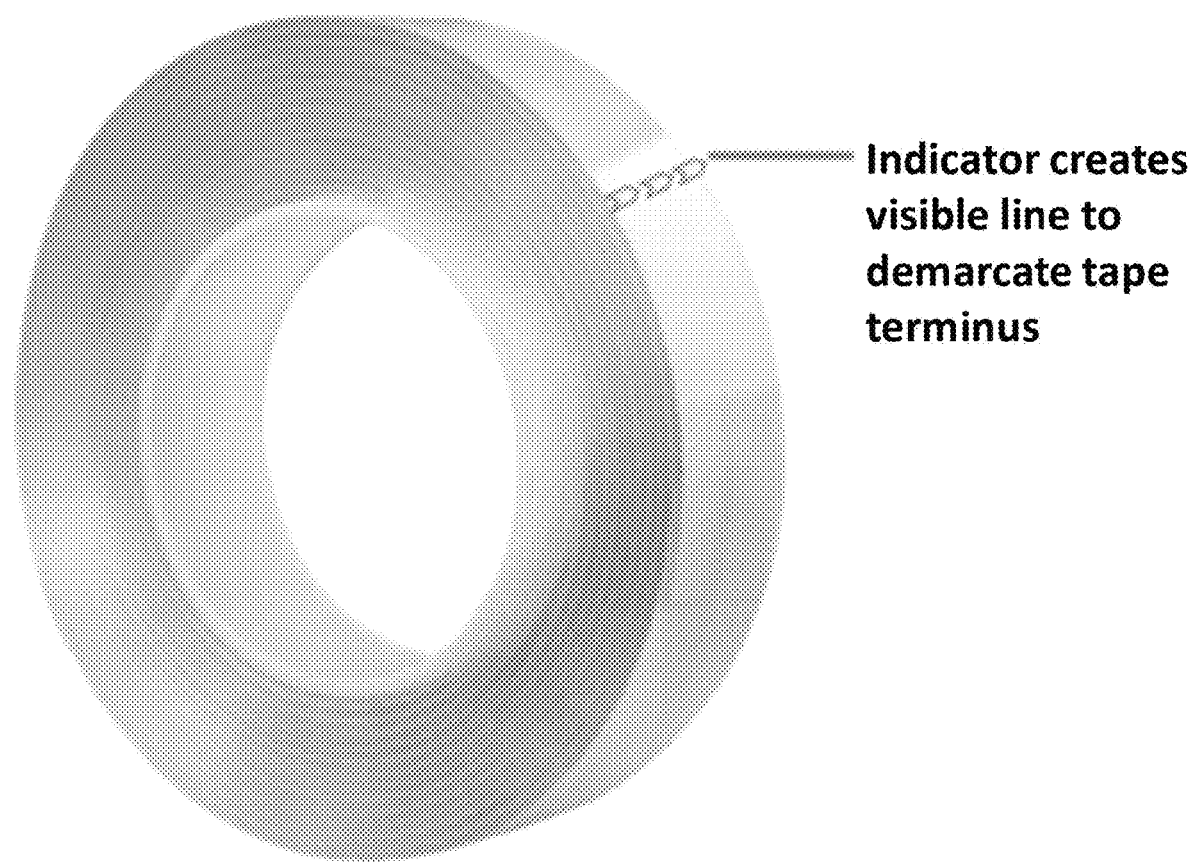
FIG. 3 shows a transparent adhesive tape roll in a closed position where the terminus is visible by way of an activated indicator (represented by arrowheads).
Figure 4:
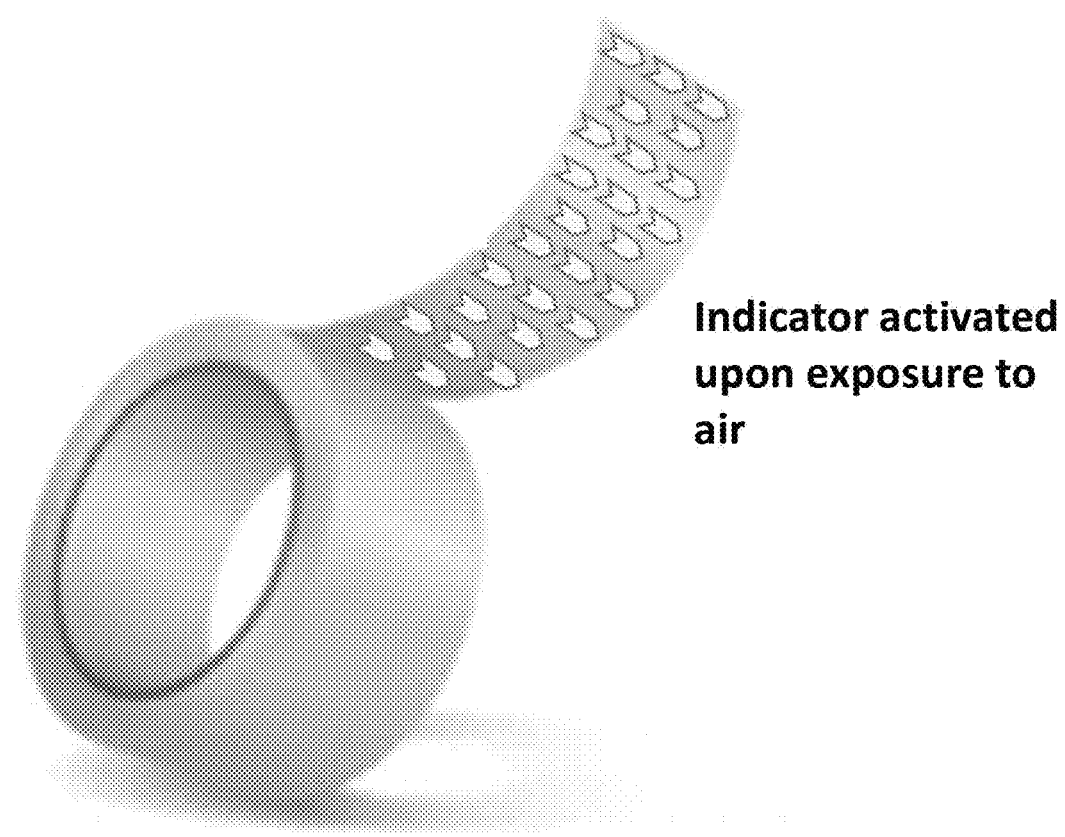
FIG. 4 shows an activated indicator (represented by arrowheads) on the adhesive side of a length of tape exposed to air.
Figure 5:
FIG. 5 shows an activated indicator (represented by arrowheads) visible through the the non-adhesive side of a length of tape exposed to air.

In some embodiments, a liner is configured in a roll (e.g., a tape roll). Examples of roll configurations are shown in FIGS. 2-5. In some embodiments, a liner comprising one or more components described herein is configured in a roll (e.g., a tape roll).

Example 1

Color-changing dyes may be produced by reducing a colored molecule repeatedly until the color changes. Such reduction may result in a different color or a colorless appearance. Oxidation of the molecule restores the color to its original state. Therefore, depending on the particular visual character and chemical reactivity of the dye in question, exposure to ambient atmospheric oxygen can change a reduced, colorless dye to its oxidized, colored form.

Such reduction-oxidation reactions can be coupled to UVA exposure. This method eliminates any need to incorporate dye in a hypoxic environment to maintain a colorless state. This strategy has been experimentally demonstrated with methylene blue (MB) in a paper by Lee et al. (2005). A film was produced by combining a polymer encapsulation medium such as hydroxyethylcellulose (HEC) with methylene blue (MB), titania (TiO2), and triethanolamine. (TEOA). Titania serves as a UV-sensitive semiconductor, reducing the molecules of MB. TEOA serves as a sacrificial electron donor (SED), providing electrons to react with the unreduced MB.

The reduced form of MB (i.e., the molecule produced after exposure of TiO2 to UV light facilitates the transfer of electrons from TEOA to MB) is known as leuco-methylene blue (LMB).

When exposed to a 100 W black-light-blue (BLB) lamp, the blue films bleached to a clear appearance within 3 minutes. In an environment with no oxygen, the MB-coated film remains clear indefinitely. When oxygen is present at atmospheric concentrations, color returns to an appreciable degree (50% of original intensity) within 1000 seconds and restores to the original intensity after 3500 seconds. Visible light had no effect on the appearance of the oxidized or reduced forms of MB. Moreover, the UV content of typical fluorescent lights is insufficient to change MB to a colorless form in an aerobic environment, making manufacturing and use under typical ambient conditions feasible.

Though MB was used by Lee et al. to demonstrate the feasibility of UV-dependent color-changing dyes, a range of redox indicators could be adapted for use in a composition provided herein (e.g., a composition comprising an adhesive associated with an indicator). Generally, such indicators would share certain features with MB. In certain configurations, the indicator itself may not be sensitive to UVA wavelengths, so as to not interfere with the activity of the reducing semiconductor. In certain configurations, the photochemistry of the indicator itself may not be susceptible to bleaching by the exclusive action of UV and visible light. The oxidized and reduced forms of the indicator are preferably significantly different in appearance, with the reduced form being colorless in certain configurations. The molecules of the reduced and oxidized forms are often stable and the reduction-oxidation reaction may be reversible.

REFERENCE

Lee, S.-K., Sheridan, M., & Mills, A. (2005). Novel UV-Activated Colorimetric Oxygen Indicator. Chemistry of Materials, 17(10), 2744-2751. https://doi.org/10.1021/cm0403863

What is claimed is:

1. A roll comprising adhesive tape, wherein the adhesive tape consists of:

a liner comprising an outer side and an underside, wherein the liner is transparent or translucent, an adhesive layer applied to the underside of the liner, and a redox indicator layer applied to the underside of the liner, wherein:

the redox indicator is activated upon exposure to one or more atmospheric components chosen from oxygen, nitrogen, argon, carbon dioxide, methane, water vapor, and neon, and the activated indicator is visible through the outer side of the liner at a terminus of the roll.

2. The roll of claim 1, wherein the redox indicator comprises one or more of methylene blue (MB), titania $(TiO_2)$, and triethanolamine (TEOA).

3. The roll of claim 1, wherein the liner is made of plastic film.

*   *   *   *   *